United States Patent
Jerebko et al.

(10) Patent No.: US 7,876,943 B2
(45) Date of Patent: Jan. 25, 2011

(54) SYSTEM AND METHOD FOR LESION DETECTION USING LOCALLY ADJUSTABLE PRIORS

(75) Inventors: Anna Jerebko, West Chester, PA (US); Marcos Salganicoff, Bala Cynwyd, PA (US); Maneesh Dewan, West Chester, PA (US); Harald Steck, Phoenixville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 317 days.

(21) Appl. No.: 12/241,183

(22) Filed: Sep. 30, 2008

(65) Prior Publication Data

US 2009/0092300 A1      Apr. 9, 2009

Related U.S. Application Data (60) Provisional application No. 60/977,117, filed on Oct. 3, 2007.

(51) Int. Cl.
*G06K 9/00* (2006.01)
*A61B 5/00* (2006.01)

(52) U.S. Cl. .................. 382/128; 382/224; 600/300

(58) Field of Classification Search .............. 382/128, 382/129, 130, 131, 132, 133, 134, 159, 170, 382/171, 224, 227; 378/4, 8, 21–27, 101, 378/901; 600/300, 407, 425, 428, 443, 586, 600/587; 128/920, 922
See application file for complete search history.

(56) References Cited

U.S. PATENT DOCUMENTS

| | | | | |
|---|---|---|---|---|
| 5,982,917 A | * | 11/1999 | Clarke et al. | 382/132 |
| 6,056,690 A | * | 5/2000 | Roberts | 600/300 |
| 6,205,236 B1 | * | 3/2001 | Rogers et al. | 382/132 |
| 7,466,848 B2 | * | 12/2008 | Metaxas et al. | 382/128 |

FOREIGN PATENT DOCUMENTS

| | | |
|---|---|---|
| WO | 2004/082453 A | 9/2004 |
| WO | 2006/128729 A | 12/2006 |

OTHER PUBLICATIONS

International Search Report including Notification of Transmittal of the International Search Report, International Search Report, and Written Opinion of the International Searching Authority.

* cited by examiner

*Primary Examiner*—Abolfazl Tabatabai (57) ABSTRACT

According to an aspect of the invention, a method for training a classifier for classifying candidate regions in computer aided diagnosis of digital medical images includes providing a training set of annotated images, each image including one or more candidate regions that have been identified as suspicious, deriving a set of descriptive feature vectors, where each candidate region is associated with a feature vector. A subset of the features are conditionally dependent, and the remaining features are conditionally independent. The conditionally independent features are used to train a naïve Bayes classifier that classifies the candidate regions as lesion or non-lesion. A joint probability distribution that models the conditionally dependent features, and a prior-odds probability ratio of a candidate region being associated with a lesion are determined from the training images. A new classifier is formed from the naïve Bayes classifier, the joint probability distribution, and the prior-odds probability ratio.

19 Claims, 8 Drawing Sheets

SYSTEM AND METHOD FOR LESION DETECTION USING LOCALLY ADJUSTABLE PRIORS

CROSS REFERENCE TO RELATED UNITED STATES APPLICATIONS

This application claims priority from "Lesion Detection With Locally Adjustable Priors", U.S. Provisional Application No. 60/977,177 of Jerebko, et al. filed Oct. 3, 2007, the contents of which are herein incorporated by reference in their entirety.

TECHNICAL FIELD

This disclosure is directed to lesion detection in digital medical images.

DISCUSSION OF THE RELATED ART

In various computer-aided detection applications, different types of lesions as well as false positive (FP) detections are typical for certain anatomical locations. For example, in computed tomographic (CT) colonography, the ileocaecal valve is often mistaken for a polyp by computer-aided detection algorithms. Another sort of false positive detection tends to occur in the colon segments where colon often is not well distended due to anatomical-physiological reasons. The distribution of real polyps also varies for different colon segments.

In lung nodule detection applications, the false positive and true positive distribution is even more dependent on anatomical location. One common source of false positives are the focal atelectesis areas, which prevail in lung apexes and base, where lung parenchyma does not fully expand with air inhalation. Blood vessel bifurcations and bends are another major source of false positives and tend to occur more away from the pleura. Larger FPs tend to occur around larger vessels. Other FP sources include osteophytes (rib bulging), which could mimic calcified nodules for computer applications. Asbestos plagues, which occur mostly in and around the pleura, present another source of common similarly looking false positives/non-lesion detections. Knowing the anatomical location and physical characteristics of these structures can help filter them out.

The probability of occurrence of a certain type of false positive or true positive detection could be computed from a set of training images using distances on manifolds. The computed probabilities can then used as priors in classification or regression tasks to reduce the false positive number in the final result.

Figure 1:
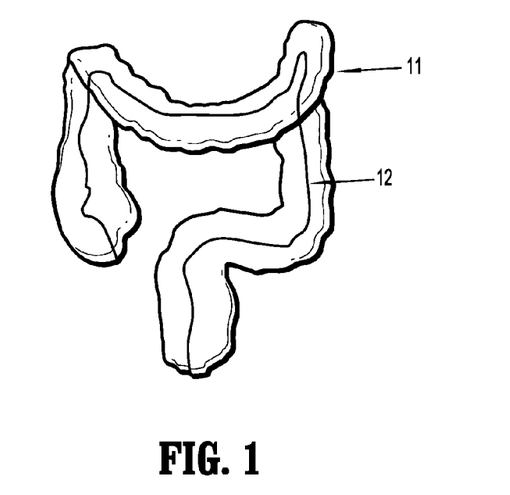
FIG. 1 depicts the outline of a colon, according to an embodiment of the invention.
Figure 2:
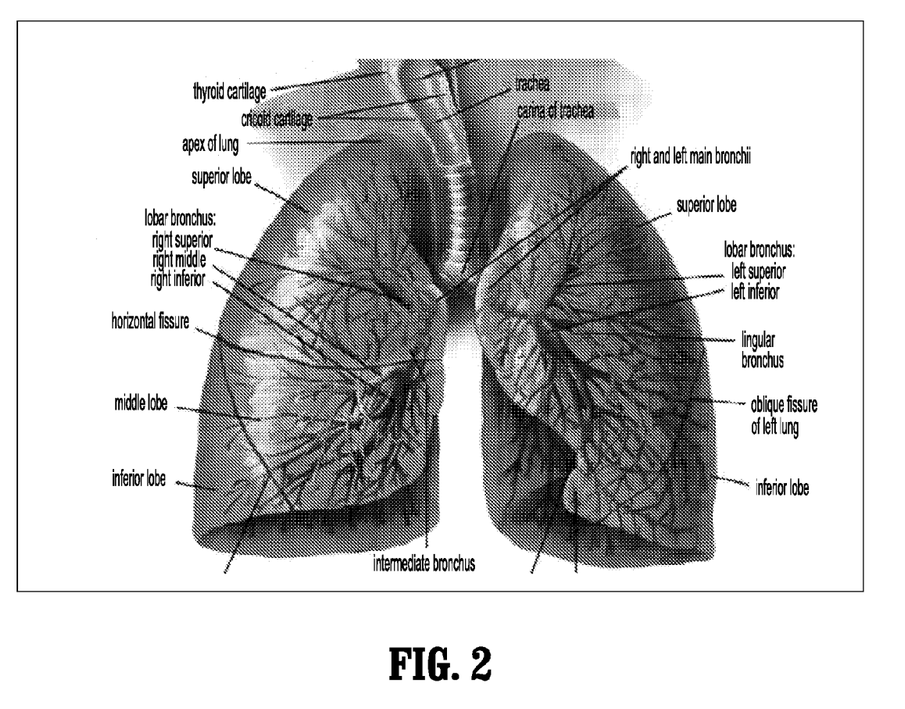
FIG. 2 presents an illustration of the lungs, according to an embodiment of the invention.

For colon polyp detection applications, the distance on a manifold could be expressed as normalized distance from the rectum along colon center line. FIG. 1 shows a colon 11 outlined in black and a gray centerline 12. For lung nodule detection applications, one could use a distance transform computed from segmented lung walls or other structures inside the lung, such as the bronchi and vessel tree or/and bronchial tree, fissures inside each lobe, normalized vertical distance from the apex of the lung, distance from lung hilum and other anatomical structures. FIG. 2 is an illustration of the lungs showing the bronchial tree. Alternatively, the distance on the bronchi or the vessel tree could be used as follows: for each candidate A, the closet point B on the tree is determined and sum of distances between A and B and between B and the root of the tree is calculated.

SUMMARY OF THE INVENTION

Exemplary embodiments of the invention as described herein generally include methods and systems for incorporating local priors into a classification framework using Bayesian networks.

According to an aspect of the invention, there is provided a method for training a classifier for classifying candidate regions in computer aided diagnosis of digital medical images, the method comprising the steps of providing a training set of images, each image including one or more candidate regions that have been identified as suspicious by a candidate generation step of a computer aided diagnosis system, and where each image has been manually annotated to identify lesions, deriving a set of descriptive feature vectors from a feature computation step of a computer aided diagnosis system, where each candidate region is associated with a feature vector, where a subset of the features are conditionally dependent, and the remaining features are conditionally independent, using the conditionally independent features to train a naïve Bayes classifier that classifies the candidate regions as lesion or non-lesion, determining a joint probability distribution from the training images that models the conditionally dependent features, determining from the training images a prior-odds probability ratio of a candidate region being associated with a lesion, and forming a new classifier from a product of the naïve Bayes classifier, the joint probability distribution for the conditionally dependent features, and the prior-odds probability ratio.

According to a further aspect of the invention, the method includes determining an operator threshold of the classifier from an ROC curve of predictions of the classifier.

According to a further aspect of the invention, the joint probability distribution for the conditionally dependent features is a ratio of whether or not a candidate region is a lesion given the conditionally dependent features, and where determining the joint probability distribution comprises using a kernel-density estimation to estimate a distribution for the candidate region to be a lesion, and to estimate a distribution for the candidate region to be a non-lesion.

According to a further aspect of the invention, the conditionally dependent features incorporate information regarding a spatial location of the candidate region in an object of interest.

According to a further aspect of the invention, the object of interest is a colon, and the spatial location is a normalized distance from a rectum measured along a colon centerline.

According to a further aspect of the invention, the object of interest is a pair of lungs, and the spatial location is specified in a lung coordinate system.

According to a further aspect of the invention, the lung coordinate system is specified in terms of a distance from a lung center reference or hilum, a distance from a lung wall, a distance from a lung apex or basal point or carina, and where it is specified whether the spatial location is in a left lung or a right lung.

According to a further aspect of the invention, the lung coordinate system is specified in terms of distances from key landmarks, vessels and airway tree structures in and around the lungs.

According to a another aspect of the invention, there is provided a method for training a classifier for classifying candidate regions in computer aided diagnosis of digital medical images, the method comprising the steps of providing a training set of images, each image including one or more candidate regions that have been identified as suspicious by a candidate generation step of a computer aided diagnosis system, and where each image has been manually annotated to identify lesions, deriving a set of descriptive feature vectors from a feature computation step of a computer aided diagnosis system, where each candidate region is associated with a feature vector, where a subset of set features are conditionally dependent and the remaining features are conditionally independent, the conditionally dependent features incorporate information regarding a spatial location and physical attributes of the candidate region in an object of interest, and training a classifier using a Bayesian network that incorporates the conditionally dependent local spatial and physical features into a prior probability, where the classifier is adapted to classifying candidate regions as lesion or non-lesion.

According to a further aspect of the invention, the conditionally dependent physical features include one or more of a density, size, or abnormality bias of the candidate region.

According to a further aspect of the invention, the classifier is represented as $$\frac{p(D=1|f_1,f_2)}{p(D=0|f_1,f_2)} = \frac{p(D=1|f_1)}{p(D=0|f_1)} \times \frac{p(D=1|f_2)}{1-p(D=1|f_2)} \times \frac{p(D=0)}{p(D=1)},$$

where p is a probability density, D–1 represents a case of a candidate region being lesion, D=0 represents a case of a candidate region being non-lesion, $f_1$ represents the conditionally dependent features, $f_2$ represents the conditionally independent features.

According to a another aspect of the invention, there is provided a program storage device readable by a computer, tangibly embodying a program of instructions executable by the computer to perform the method steps for classifying candidate regions in computer aided diagnosis of digital medical images.

DETAILED DESCRIPTION OF EXEMPLARY EMBODIMENTS

Exemplary embodiments of the invention as described herein generally include systems and methods for lesion detection in digital medical images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3 -dimensional image, the domain of the image is typically a 2- or 3-dimensional rectangular array, where each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Theory

A lesion detection method according to an embodiment of the invention incorporates local prior into a classification framework using Bayesian networks. Although a method is described in terms of an exemplary, non-limiting spatial local prior, a method according to an embodiment of the invention is general and not restricted to the particular spatial local prior. For example, distance to the vessels and/or airways could be additional spatial information that can be incorporated. Furthermore, other local prior information in terms of density, size or a particular abnormality bias can be easily incorporated as well.

Lung Spatial Local Prior

Figure 3A:
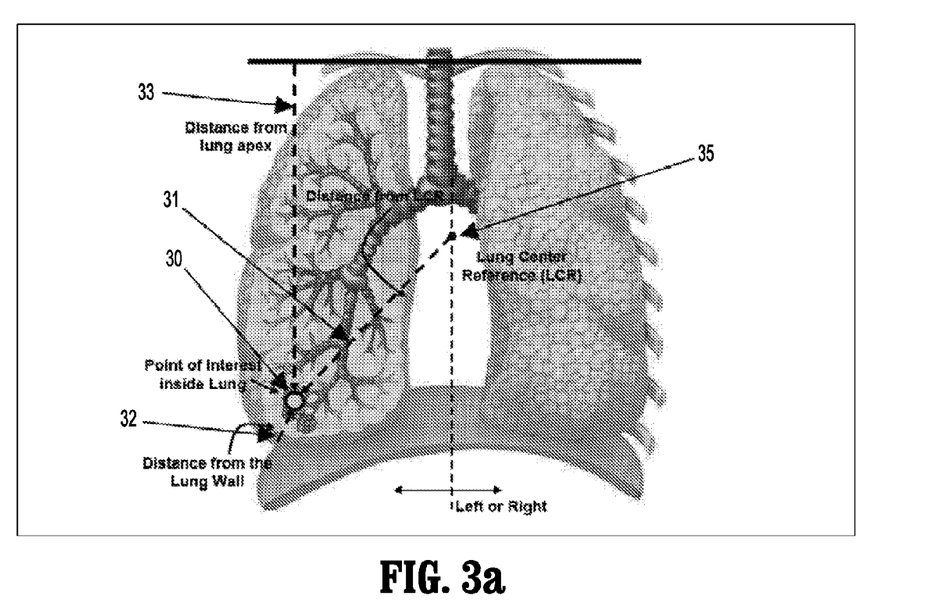
FIG. 3a illustrates a lung-specific spatial coordinate system, according to an embodiment of the invention.
Figure 3B:
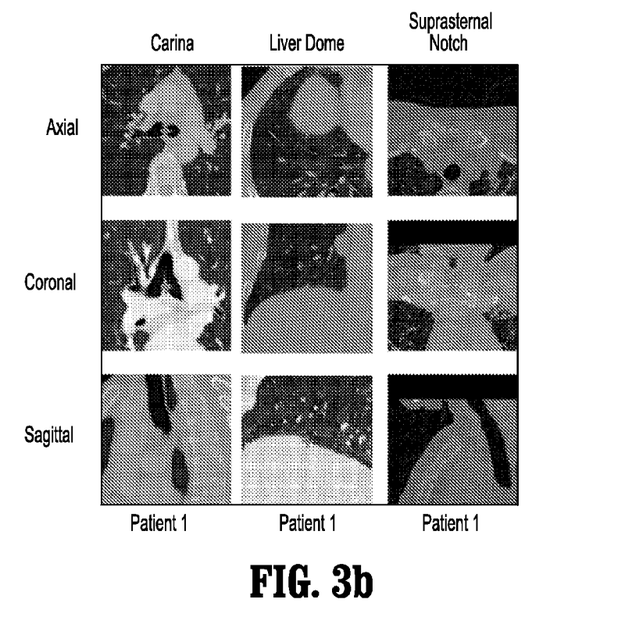
FIG. 3b illustrates key landmarks for the LCR, lung basal and apical points, according to an embodiment of the invention.

The spatial information within the lung is encoded through a specific spatial coordinate system shown in FIG. 3a. A point of interest 30 in the lung can be characterized by the following spatial coordinates: (1) $P_C$: Distance 31 from the lung center reference 35 (LCR); (2) $P_W$: Distance 32 from the Lung Wall; (3) $P_A$: Distance 33 from the lung apex or basal point; and (4) PLR: Left (+1) or right (−1) of the LCR. These spatial coordinates can be computed using lung segmentation. The center of mass of the lung segmentation is used to compute the LCR, and the bounds of the lung segmentation give the apical and basal points in the lung. The distance from the lung wall is computed using the distance transform of the lung segmentation. An alternative way is to instead use key landmarks, i.e., 'Carina', 'Suprasternal notch', and 'Liver dome' to define the LCR, apical and basal lung points respectively. FIG. 3b shows, from left to right, the 'Carina', 'Suprasternal notch', and 'Liver dome' landmarks for LCR, lung basal and apical points in a single patient. The top row is the axial view, the middle row is the coronal view, and the bottom row is the sagittal view. Finally, all these spatial coordinates are normalized for each patient separately.

Bayesian Networks for Incorporation of Local Prior

Figure 4:
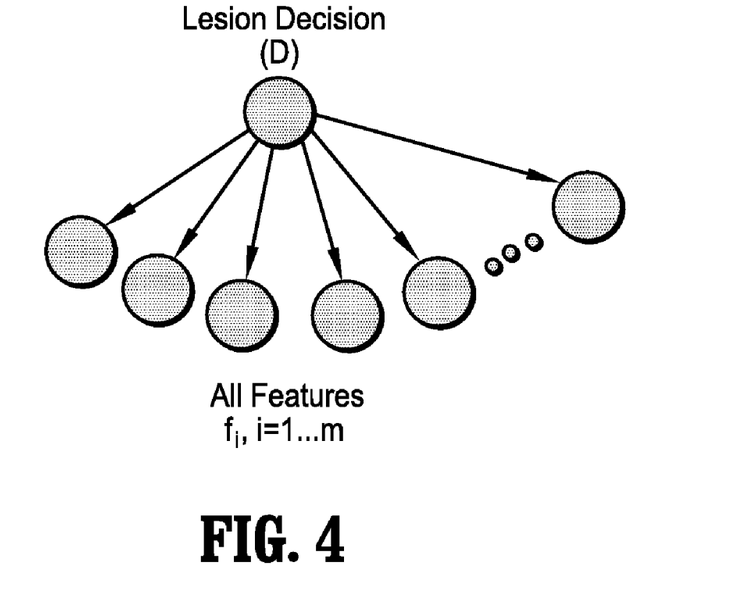
FIG. 4 depicts a Bayesian network of a typical classifier, according to an embodiment of the invention.
Figure 5:
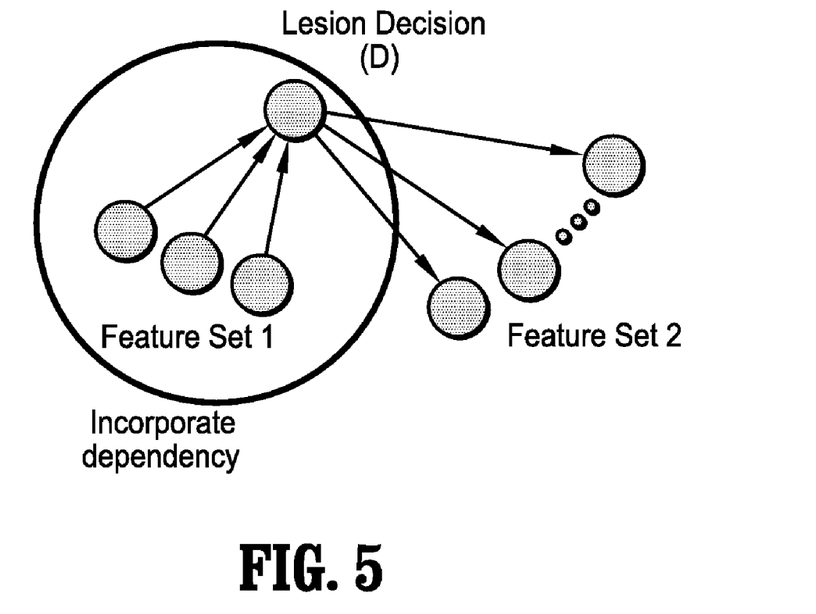
FIG. 5 depicts a Bayesian network incorporating dependency among features, according to an embodiment of the invention.

Bayesian networks, also known as directed graphical models, are a way of incorporating causal relationships among different variables. A Bayesian network for a naïve Bayesian network classifier is shown in FIG. 4, where the task is to compute a decision D (+1 or 0) for a lesion, given a set of features $f_i$, i=1, ..., m. Here, a typical assumption is that all the features are conditionally independent. However, this assumption might not be true for a particular set of features, for example the spatial features defined above. In order to incorporate the dependency of such features, one should modify the Bayesian network as shown in FIG. 5, where feature sets 1 and 2 are the conditionally dependent and independent set of features respectively. In FIGS. 4 and 5, the direction of the edges of interest is reversed so that they point toward the decision variable D. As a variant, intermediate hidden variables may be introduced.

Typically, in classification the goal is to compute the probability whether or not a particular candidate is a lesion, given all the features. This can be formally given by $p(D=1|f_i, i=1, ..., m)$, or $$\frac{p(D=1|f_i, i=1 \ldots m)}{p(D=0|f_i, i=1 \ldots m)}.$$

The second term is a probability ratio between whether a candidate is a lesion (D+1) or not (D=0). The rationale for using the probability ratio is usually to avoid computation of joint and/or marginal probability distributions. A method according to an embodiment of the invention uses the probability ratio as well. To incorporate a dependent set of features into the classification framework the corresponding Bayesian network should be the one shown in FIG. 5. Denote feature sets 1 and 2 by $f_1$ and $f_2$ respectively, where one assumes feature set $f_1$ is the dependent set. Using the Bayes rule, the probability ratio can be written as $$\frac{p(D=1|f_1, f_2)}{p(D=0|f_1, f_2)} = \frac{p(D=1, f_1, f_2)/p(f_1, f_2)}{p(D=0, f_1, f_2)/p(f_1, f_2)} \quad (1)$$
$$= \frac{p(D=1, f_1, f_2)}{p(D=0, f_1, f_2)}.$$

The joint probability of the Bayesian network in FIG. 5 is given by $$p(D,f_1,f_2) = p(D|f_1)p(f_2|D)p(f_1) \quad (2)$$

Incorporating EQ. (2) into EQ. (1), one obtains $$\frac{p(D=1|f_1, f_2)}{p(D=0|f_1, f_2)} = \frac{p(D=1|f_1)p(f_2|D=1)p(f_1)}{p(D=0|f_1)p(f_2|D=0)p(f_1)}. \quad (3)$$

Applying Bayes rule again for $p(f_2|D)$, EQ. (3) becomes $$\frac{p(D=1|f_1, f_2)}{p(D=0|f_1, f_2)} = \frac{p(D=1|f_1)p(D=1|f_2)p(f_2)/p(D=1)}{p(D=0|f_1)p(D=0|f_2)p(f_2)/p(D=0)} \quad (4)$$
$$= \underbrace{\frac{p(D=1|f_1)}{p(D=0|f_1)}}_{\text{Modeling term}} \underbrace{\frac{p(D=1|f_2)}{1-p(D=1|f_2)}}_{\text{Classifier Term}} \underbrace{\frac{p(D=0)}{p(D=1)}}_{\text{Prior Odds Term}}.$$

The final classifier $$\frac{p(D=1|f_1, f_2)}{p(D=0|f_1, f_2)}$$

can be thought of being composed of three terms as shown in EQ. (4). The 'Classifier' term is the output of a conventional (naïve Bayes) classifier using feature set $f_2$. The 'Prior Odds' term is the ratio between the prior knowledge of the occurrence of a lesion and a non-lesion candidate. The 'Modeling' term involving the dependent set of features $f_1$ can be estimated using parametric or non-parametric techniques. According to an embodiment of the invention, kernel-density estimation (KDE) is used, which is a non-parametric technique for modeling the two distributions $p(D=1|f_1)$ and $p(D=0|f_1)$. It us to be understood, however, the KDE is exemplary and non-limiting, and other techniques can be used to model the distributions in other embodiments of the invention. A final classifier according to an embodiment of the invention can be easily trained from the training data. Typically, a logarithm of $$\frac{p(D=1|f_1, f_2)}{p(D=0|f_1, f_2)}$$

is taken that makes the Prior Odds' term a constant. This constant can be incorporated in the threshold parameter, thereby avoiding its computation.

Figure 8:
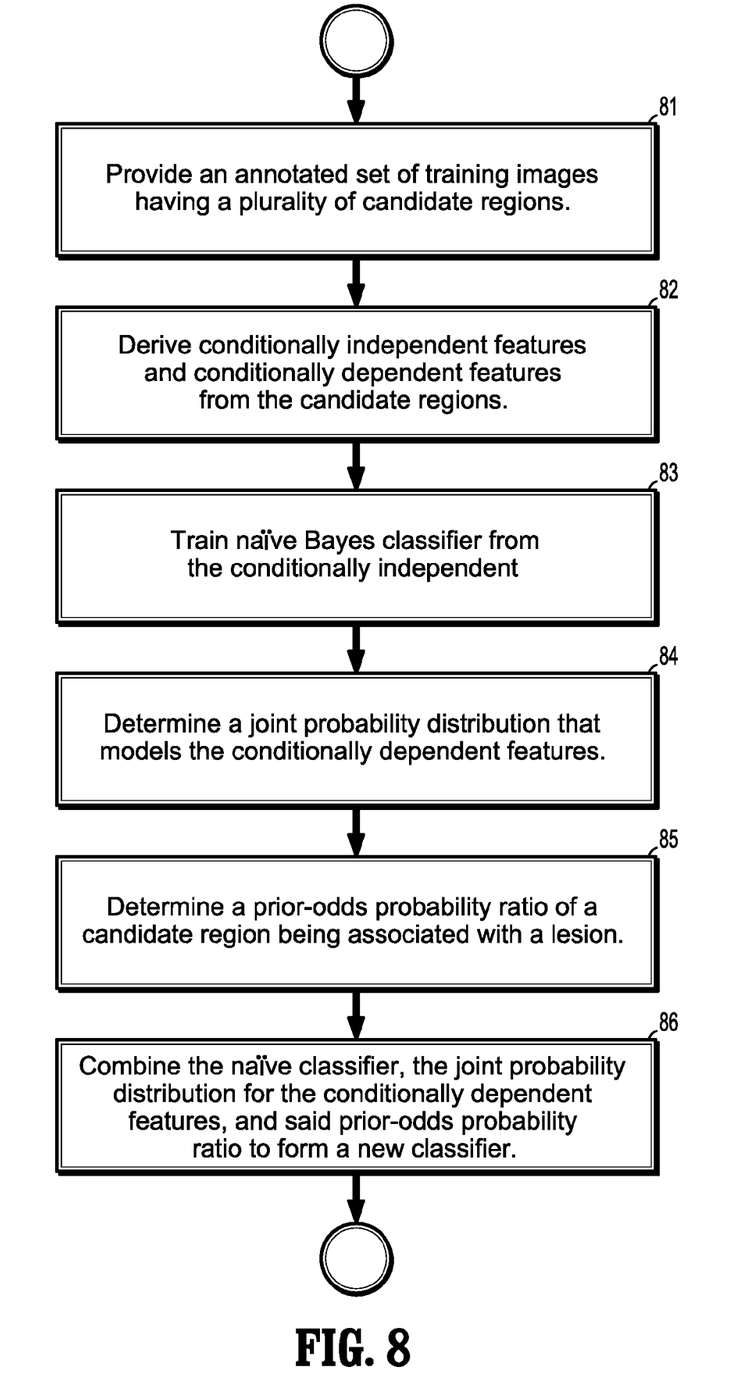
FIG. 8 is a flowchart of a method for lesion detection that incorporates local priors, according to an embodiment of the invention.

A flowchart of a method for training a classifier for lesion detection that incorporates local priors is shown in FIG. 8. A method starts by providing a providing at step 81a training set of expert annotated images having one or more candidate regions in an object of interest. The candidate regions have been identified as suspicious by a candidate generation step of a computer aided diagnosis system, and the expert identifies lesions in the images. At step 82, a feature computation step of a computer aided diagnosis system generates a set of descriptive feature vectors for each candidate region. A subset of the features are identified as being conditionally dependent, and the remaining features are conditionally independent. Examples of the conditionally dependent features include local spatial information such as a distance of a candidate region from a reference location in a coordinate system specific to the object of interest, such as the colon or lungs. At step 83, the conditionally independent features are used to train a naïve Bayes classifier that classifies the candidate regions as lesion or non-lesion. At step 84, a joint probability distribution is determined from the training data that models the conditionally dependent features. At step 85, a prior-odds probability ratio of a candidate region being associated with a lesion is calculated from the training data. Steps 83, 84 and 85 may also be performed in parallel to each other, or sequentially in a different order. Finally, at step 86, a new classifier is formed from a product of the naïve Bayes classifier, the joint probability distribution for the conditionally dependent features, and the prior-odds probability ratio. This classifier can be further trained using either the training data or test data.

Results

Figure 6A:
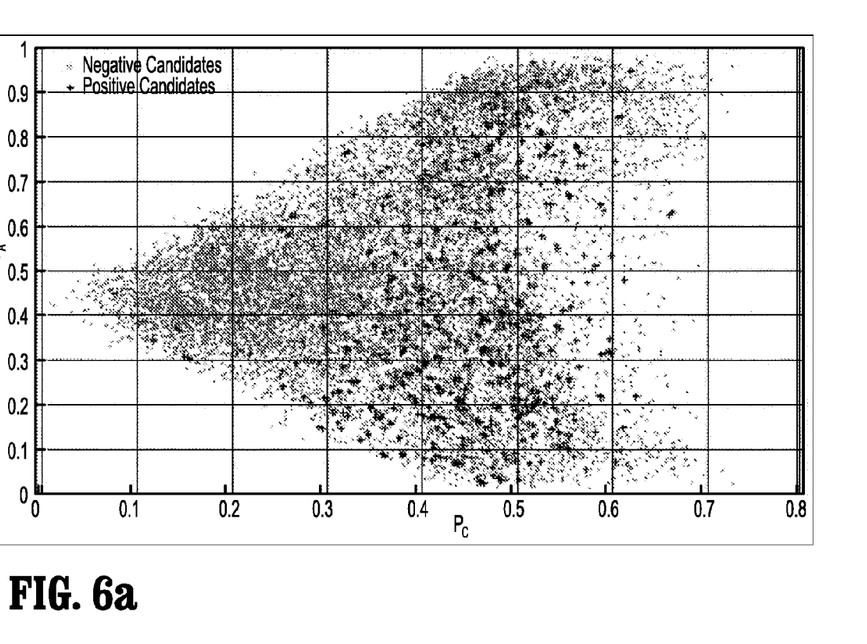
FIG. 6a shows the spatial distribution of positive and negative candidates in the lung normalized across multiple patients, according to an embodiment of the invention.
Figure 6B:
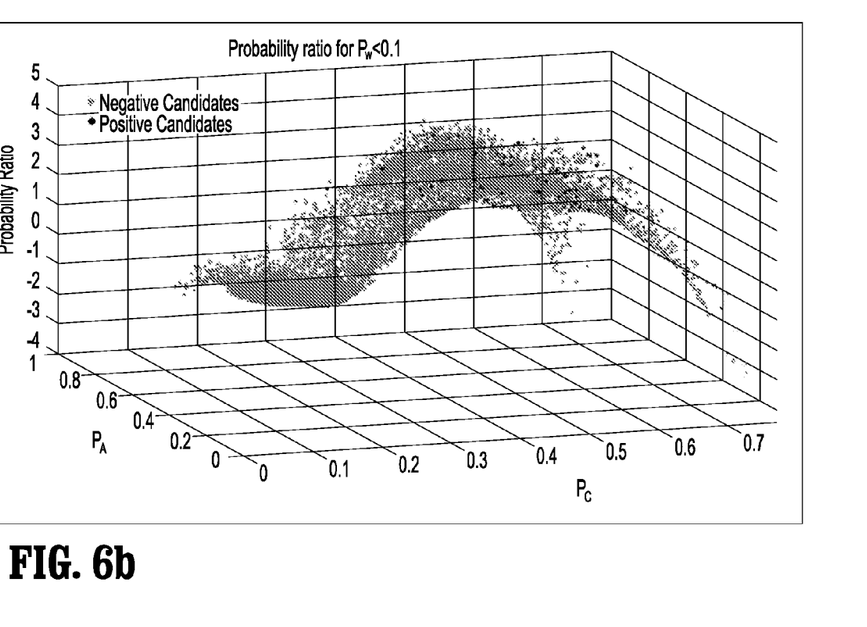
FIG. 6b shows the probability ratio of the modeling term in EQ. (4), according to an embodiment of the invention.
Figure 7A:
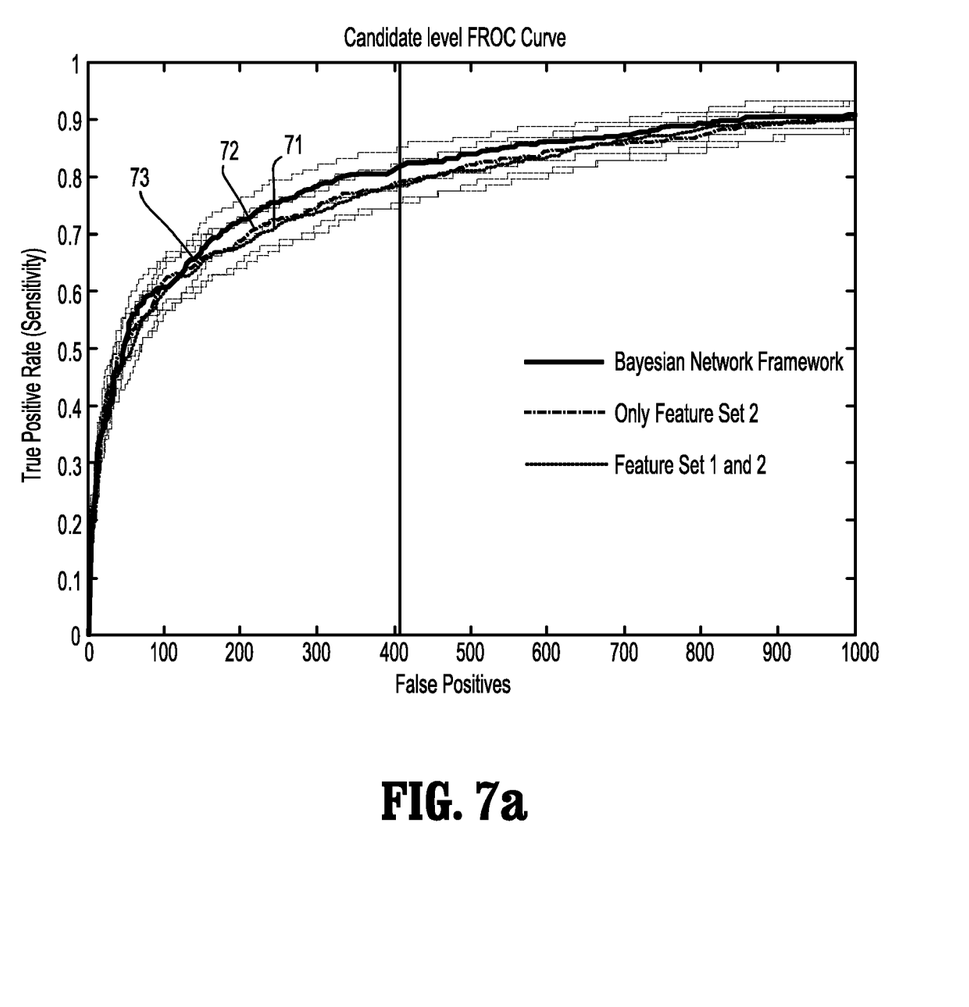
FIGS. 7a-b illustrates candidate level FROC curves for training and validation data, according to an embodiment of the invention.
Figure 7B:
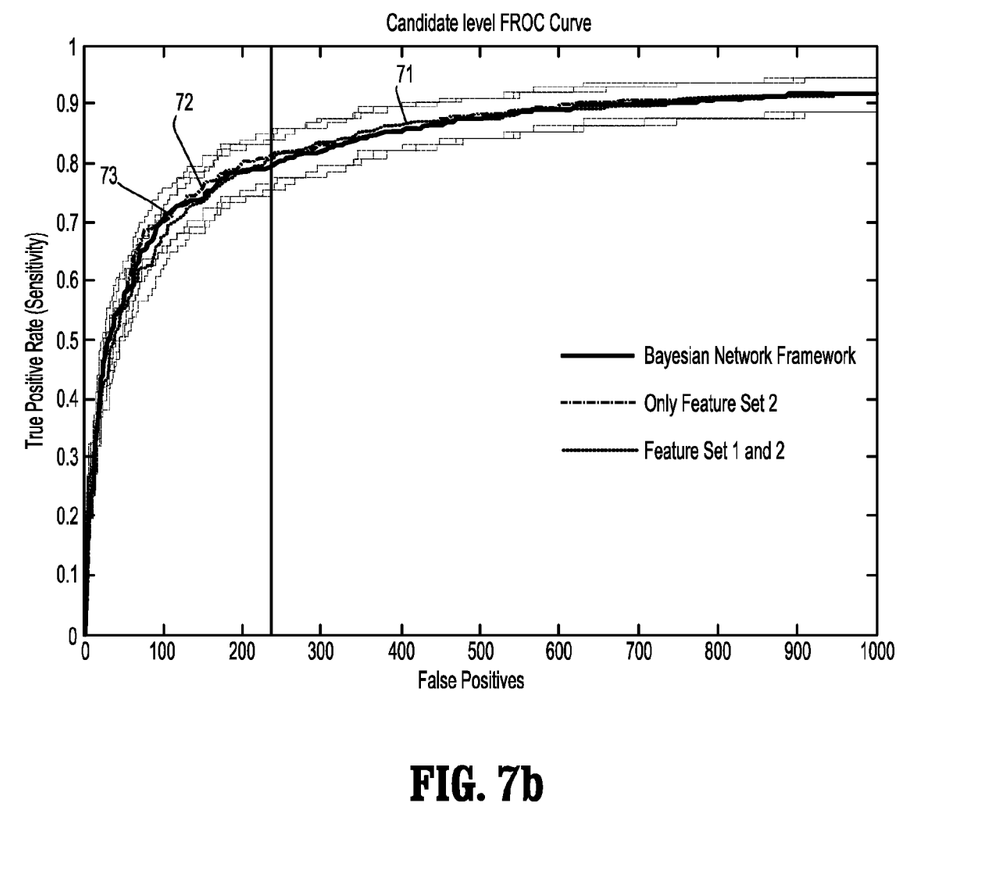

Here are presented some preliminary results of a method according to an embodiment of the invention on lung nodule detection. FIG. 6a shows the spatial distribution of the training data candidates, including positive candidates (black crosses) associated with lesions, and negative candidates (gray dots), generated by a candidate generation algorithm, in two of the lung spatial coordinates, normalized across multiple patients. The probability ratio of the modeling term of EQ. (4) is depicted in FIG. 6b, again with black dots representing positive candidates and gray dots representing negative candidates. It is evident that there are lung regions with predominantly negative candidates and that knowledge can be easily incorporated using a Bayesian network framework according to an embodiment of the invention to reduce potential false positives (FPs). FIGS. 7a-b shows both training (FIG. 7a) and validation (FIG. 7b) candidate-level FROC curves comparing a conventional (naïve Bayes) classifier using only feature set 2 (dark gray curve 72), both feature sets 1 and 2 (light gray curve 71), and a Bayesian network classifier according to an embodiment of the invention (black curve 71). The dotted lines are the error margins of the corresponding FROC curves. It is easy to see the potential benefit in the training (re-substitution) FROC curve comparisons. The validation results on the other hand are quite similar, probably due to the sparse positive sample data, making it difficult to model and hence generalize from training to validation. The training data includes 236 patients and 536 nodule lesions, whereas the validation data included 138 patients and 277 nodule lesions.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
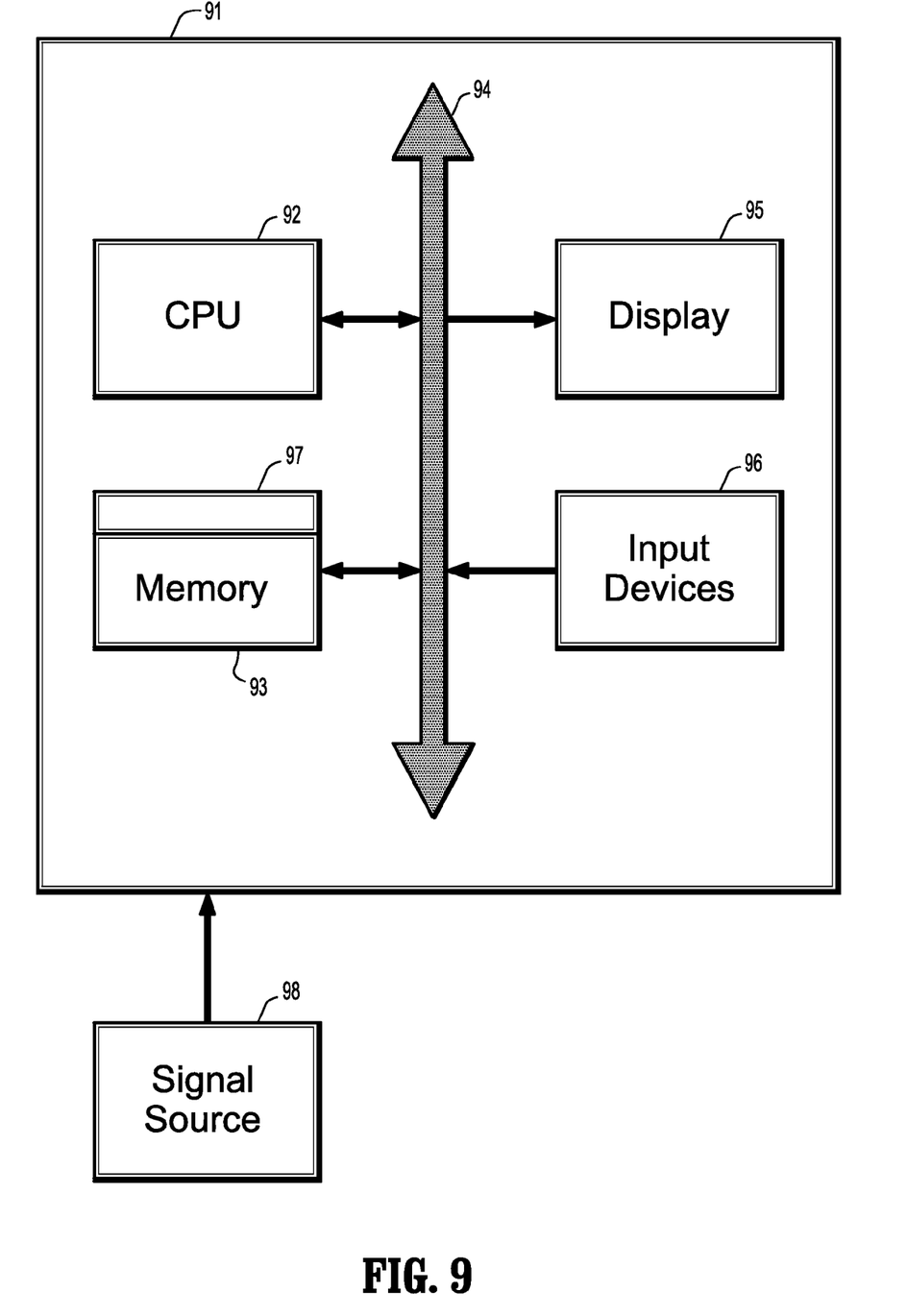
FIG. 9 is a block diagram of an exemplary computer system for implementing a method for lesion detection in digital medical images, according to an embodiment of the invention.

FIG. 9 is a block diagram of an exemplary computer system for implementing a method and system for incorporating local priors into a classification framework using Bayesian networks according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for training a classifier for classifying candidate regions in computer aided diagnosis of digital medical images, said method comprising the steps of:
   providing a training set of images, each said image including one or more candidate regions that have been identified as suspicious by a candidate generation step of a computer aided diagnosis system, and wherein each said image has been manually annotated to identify lesions;
   deriving a set of descriptive feature vectors from a feature computation step of a computer aided diagnosis system, wherein each candidate region is associated with a feature vector, wherein a subset of said features are conditionally dependent, and the remaining features are conditionally independent;
   using said conditionally independent features to train a naïve Bayes classifier that classifies said candidate regions as lesion or non-lesion;
   determining a joint probability distribution from said training images that models the conditionally dependent features;
   determining from said training images a prior-odds probability ratio of a candidate region being associated with a lesion; and
   forming a new classifier from a product of said naïve Bayes classifier, said joint probability distribution for the conditionally dependent features, and said prior-odds probability ratio.

2. The method of claim 1, further comprising determining an operator threshold of said classifier from an ROC curve of predictions of said classifier.

3. The method of claim 1, wherein said joint probability distribution for the conditionally dependent features is a ratio of whether or not a candidate region is a lesion given said conditionally dependent features, and wherein determining said joint probability distribution comprises using a kernel-density estimation to estimate a distribution for said candidate region to be a lesion, and to estimate a distribution for said candidate region to be a non-lesion.

4. The method of claim 1, wherein said conditionally dependent features incorporate information regarding a spatial location of said candidate region in an object of interest.

5. The method of claim 4, wherein said object of interest is a colon, and said spatial location is a normalized distance from a rectum measured along a colon centerline.

6. The method of claim 4, wherein said object of interest is a pair of lungs, and said spatial location is specified in a lung coordinate system.

7. The method of claim 6, wherein said lung coordinate system is specified in terms of a distance from a lung center reference or hilum, a distance from a lung wall, a distance from a lung apex or basal point or carina, and where it is specified whether said spatial location is in a left lung or a right lung.

8. The method of claim 6, wherein said lung coordinate system is specified in terms of distances from key landmarks, vessels and airway tree structures in and around the lungs.

9. A method for training a classifier for classifying candidate regions in computer aided diagnosis of digital medical images, said method comprising the steps of:
  providing a training set of images, each said image including one or more candidate regions that have been identified as suspicious by a candidate generation step of a computer aided diagnosis system, and wherein each said image has been manually annotated to identify lesions;
  deriving a set of descriptive feature vectors from a feature computation step of a computer aided diagnosis system, wherein each candidate region is associated with a feature vector, wherein a subset of set features are conditionally dependent and the remaining features are conditionally independent, said conditionally dependent features incorporate information regarding a spatial location and physical attributes of said candidate region in an object of interest; and
  training a classifier using a Bayesian network that incorporates said conditionally dependent local spatial and physical features into a prior probability, wherein said classifier is adapted to classifying candidate regions as lesion or non-lesion.

10. The method of claim 9, wherein said conditionally dependent physical features include one or more of a density, size, or abnormality bias of said candidate region.

11. The method of claim 10, wherein said classifier is represented as $$\frac{p(D=1\mid f_1, f_2)}{p(D=0\mid f_1, f_2)} = \frac{p(D=1\mid f_1)}{p(D=0\mid f_1)} \times \frac{p(D=1\mid f_2)}{1-p(D=1\mid f_2)} \times \frac{p(D=0)}{p(D=1)},$$

wherein p is a probability density, D=1 represents a case of a candidate region being lesion, D=0 represents a case of a candidate region being non-lesion, $f_1$ represents said conditionally dependent features, $f_2$ represents said conditionally independent features.

12. A program storage device readable by a computer, tangibly embodying a program of instructions executable by the computer to perform the method steps for classifying candidate regions in computer aided diagnosis of digital medical images, said method comprising the steps of:
  providing a training set of images, each said image including one or more candidate regions that have been identified as suspicious by a candidate generation step of a computer aided diagnosis system, and wherein each said image has been manually annotated to identify lesions;
  deriving a set of descriptive feature vectors from a feature computation step of a computer aided diagnosis system, wherein each candidate region is associated with a feature vector, wherein a subset of said features are conditionally dependent, and the remaining features are conditionally independent;
  using said conditionally independent features to train a naïve Bayes classifier that classifies said candidate regions as lesion or non-lesion;
  determining a joint probability distribution from said training images that models the conditionally dependent features;
  determining from said training images a prior-odds probability ratio of a candidate region being associated with a lesion; and
  forming a new classifier from a product of said naïve Bayes classifier, said joint probability distribution for the conditionally dependent features, and said prior-odds probability ratio.

13. The computer readable program storage device of claim 12, the method further comprising determining an operator threshold of said classifier from an ROC curve of predictions of said classifier.

14. The computer readable program storage device of claim 12, wherein said joint probability distribution for the conditionally dependent features is a ratio of whether or not a candidate region is a lesion given said conditionally dependent features, and wherein determining said joint probability distribution comprises using a kernel-density estimation to estimate a distribution for said candidate region to be a lesion, and to estimate a distribution for said candidate region to be a non-lesion.

15. The computer readable program storage device of claim 12, wherein said conditionally dependent features incorporate information regarding a spatial location of said candidate region in an object of interest.

16. The computer readable program storage device of claim 15, wherein said object of interest is a colon, and said spatial location is a normalized distance from a rectum measured along a colon centerline.

17. The computer readable program storage device of claim 15, wherein said object of interest is a pair of lungs, and said spatial location is specified in a lung coordinate system.

18. The computer readable program storage device of claim 17, wherein said lung coordinate system is specified in terms of a distance from a lung center reference or hilum, a distance from a lung wall, a distance from a lung apex or basal point or carina, and where it is specified whether said spatial location is in a left lung or a right lung.

19. The computer readable program storage device of claim 17, wherein said lung coordinate system is specified in terms of distances from key landmarks, vessels and airway tree structures in and around the lungs.

* * * * *